M. CLARKE.
COMPOUND MEASURING INSTRUMENT.
APPLICATION FILED NOV. 14, 1910.
1,007,269.
Patented Oct. 31, 1911.
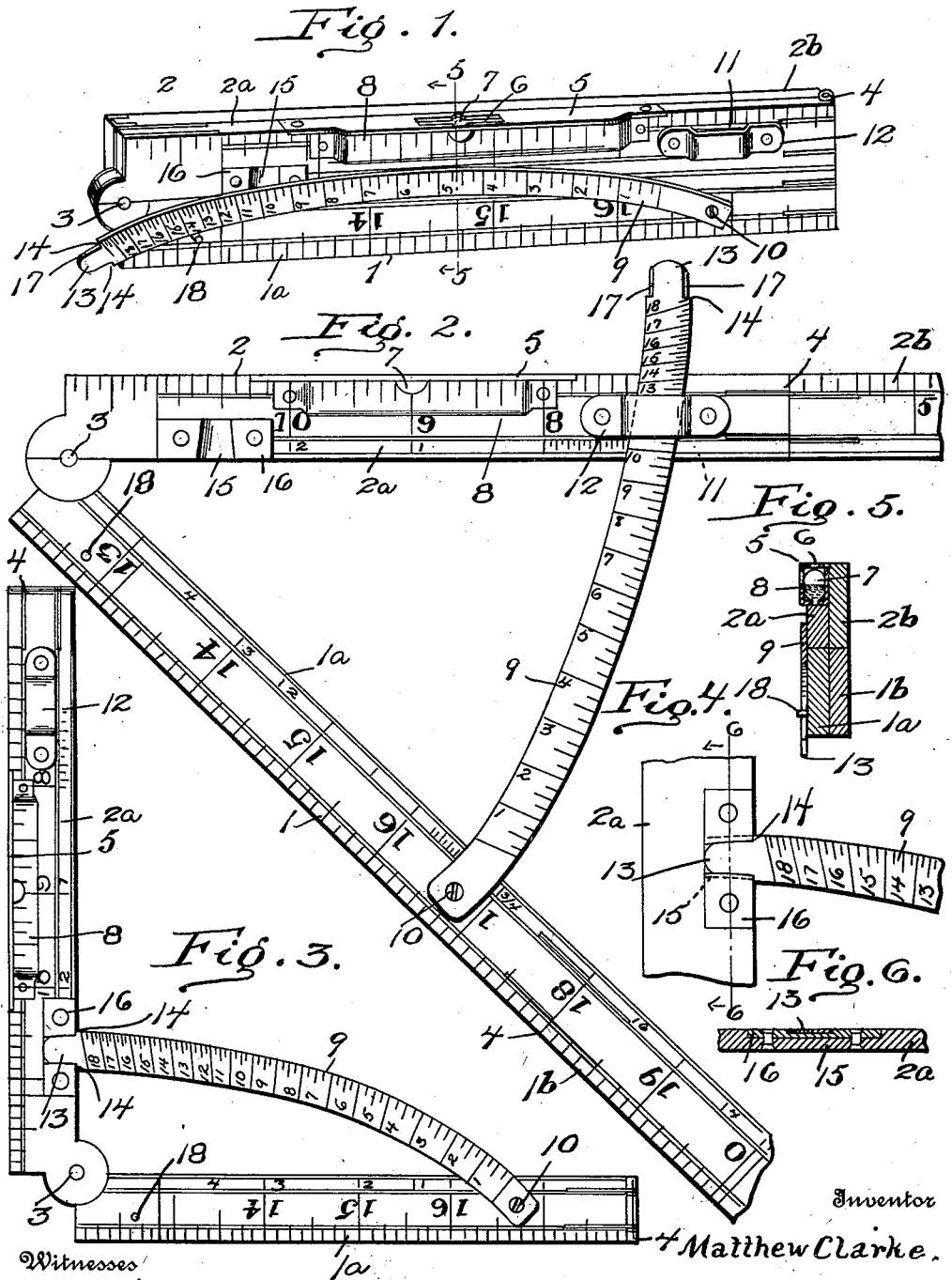
Inventor
Matthew Clarke.
Witnesses
By
Attorneys

UNITED STATES PATENT OFFICE.

MATTHEW CLARKE, OF WILKES-BARRE, PENNSYLVANIA.

COMPOUND MEASURING INSTRUMENT.

1,007,269. Specification of Letters Patent. Patented Oct. 31, 1911.

Application filed November 14, 1910. Serial No. 592,397.

*To all whom it may concern:*

Be it known that I, MATTHEW CLARKE, citizen of the United States, residing at Wilkes-Barre, in the county of Luzerne and State of Pennsylvania, have invented certain new and useful Improvements in Compound Measuring Instruments, of which the following is a specification.

The present invention comprehends certain new and useful improvements in compound measuring instruments, and the object of the invention is an improved device of this character which may be used as a clinometer for ascertaining the pitch of chutes, timbers, and other inclined objects, and which is also susceptible of use as a square, level, and rule.

Another object of the invention is a measuring instrument consisting of a pair of pivotally united members, and a scale bar pivoted to one of the members and having a sliding connection with the remaining member to indicate the angle between the members, the scale bar being adapted to be withdrawn from sliding engagement with the remaining member and being provided with the terminal tongue arranged to be seated in a recess in said remaining member, whereby to hold the members at right angles to each other to permit the instrument to be employed as a square.

A further object of the invention is a measuring instrument which is quite reliable and efficient in operation, which is simple, durable and strong in construction, and which may be folded into a compact form.

With this and other objects in view that will more fully appear as the description proceeds, the invention consists in certain construction and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawing, in which;—

Figure 1 is a perspective view showing my improved instrument folded; Fig. 2 is a side elevation, partly broken away, illustrating the position of the parts when the instrument is employed as a clinometer; Fig. 3 is a side elevation with the scale bar engaging the seating recess to retain the members at a right angle for use as a square; Fig. 4 is a detail view showing the tongue fitted in the seating recess; Fig. 5 is a transverse section on the line 5—5 of Fig. 1; and, Fig. 6 is a section on the line 6—6 of Fig. 4.

Corresponding and like parts are referred to in the following description and indicated in all the views of the drawing by the same reference characters.

My improved measuring instrument includes a pair of coacting arms or members 1 and 2, which are pivotally united at one end as indicated at 3. Each member is preferably one foot in length and is graduated in inches and fractions thereof. At its middle point each member is divided to form separate sections, the sections of the member 1 being designated $1^a$ and $1^b$ and the sections of the other member being designated, $2^a$ and $2^b$. The sections $1^a$ and $2^a$ are connected together by the pivot joint 3. The sections of each member are pivotally united, as indicated at 4, whereby to enable the end sections $1^b$ and $2^b$ to be folded laterally against one side of the sections $1^a$ and $2^a$ to provide a compact structure.

The foregoing structure is the same as that of the well-known folding rule, and hence requires no further description.

A plate 5 is secured to and countersunk in the outer edge of the section $2^a$ and has a sight opening 6 through which a spirit level 7 is visible. The spirit level is substantially inclosed in a metallic casing 8 secured in a suitable recess in the said edge of the section.

A metallic scale bar 9 is pivoted, as indicated at 10, on one side of the section $1^a$. This scale bar passes slidably through a transverse opening 11 provided by a metallic guide strap 12 secured on one side of the section $2^a$. The scale bar may be graduated in any suitable manner, but is preferably laid off on one side in degrees and on another side to indicate the pitch in inches and fractions thereof. At its free end the scale bar is formed with a terminal tongue 13 that is reduced in width in order to provide stop shoulders 14 at the base of the tongue. When the scale bar has been withdrawn from the transverse opening 11, the tongue may be inserted in a seating recess 15 which is provided in the section $2^a$ at a point between the joint 3 and the guide strap 12. In the present instance the seating recess is formed in the outer face of a metallic plate 16 that is secured to and countersunk in one side of the section 2ª flush with the inner edge of said section. The seating recess extends transversely with respect to the section 2ª and leads from the inner edge thereof. The side walls of the seating recesses are undercut and engage with the beveled side edges 17 of the tongue to retain the tongue against displacement. The stop shoulders 14 bear against the adjacent edge of the plate 16 so that the scale bar serves to positively prevent the members 1 and 2 from being moved any closer together. The members are thus retained at a given angle, preferably at a right angle to permit the device to be employed as a square. It will be noted that the seating recess decreases gradually in width from its mouth, and that the tongue is correspondingly tapered. The tongue may be thus inserted in the seating recesses with greater facility. However, another advantage arises from this arrangement, namely, that the tongue engages in the seating recesses with a wedging action and hence is frictionally retained therein against withdrawal. By disengaging the tongue from the seating recess, the coacting members 1 and 2 are released and may be turned against each other to assume a folded position. In such position the scale bar 9 lies flat against one side of the sections 1ª and 2ª with its free end projecting slightly beyond the pivot joint 3. The scale bar is confined between a stop pin 18 outstanding from the section 1ª, and the casing 8 which is extended laterally beyond the corresponding side of the section 2ª. The pivotal movement of the scale bar is thus limited to such an extent as to cause the scale bar to lie entirely between the outer edges of the members throughout its length. The instrument is therefore, very compact when folded, and may be readily carried in the pocket or inclosed within a small package for shipping purposes.

In the practical use of the invention, if it is desired to ascertain the pitch of a chute or other inclined object, the scale bar is inserted through the guide strap 12, and the member 1 is placed flat against the said object. Member 2 is then swung upwardly about the pivot 3 and is placed in a horizontal position with the aid of the spirit level 7. The pitch of the object is indicated on the scale bar by the lower edge of the strap 12, while the degree of inclination is indicated on the scale bar by the lower edge of the section 2ª. When the scale bar is engaged with the seating recess the instrument may be used as a square, in the accustomed manner. By placing the member 1 of the square against an upright object, the level 7 will serve to indicate whether or not the object is plumb. The instrument may also be employed as an ordinary rule, and when folded, may be used as a level. In view of the many functions which the single instrument will perform, it will be apparent that it is quite convenient and is very desirable from a commercial standpoint.

Having thus described the invention, what I claim as new is:—

1. A compound measuring instrument including a pair of pivotally united members, one of said members being provided with a transverse guide opening and with a seating recess independent of the guide opening, and a scale bar pivoted at one end to the other member and adapted to pass slidably through the transverse opening, the free end of the scale bar being arranged to be fitted within the seating recess when the scale bar is withdrawn from the guide opening, whereby to hold the members spread apart at a predetermined angle.

2. A compound measuring instrument including a pair of pivotally united members, one of said members being provided with a transverse guide opening, a scale bar pivotally connected to the other member and arranged to pass slidably through the transverse opening to indicate the angle between the members, the scale bar being formed at its free terminal with a tongue, and means provided on the first-named member for receiving and engaging with the tongue when the scale bar is withdrawn from the guide opening, whereby to retain the members spread apart at a predetermined angle.

In testimony whereof, I affix my signature in presence of two witnesses.

MATTHEW CLARKE. [L. S.]

Witnesses:
  ROBERT J. BLAIR,
  H. H. DAVENPORT.

---

Copies of this patent may be obtained for five cents each, by addressing the "Commissioner of Patents, Washington, D. C."